L. THOMAS.
Manufacture of Nuts.
No. 42,320.    Patented April 12, 1864.
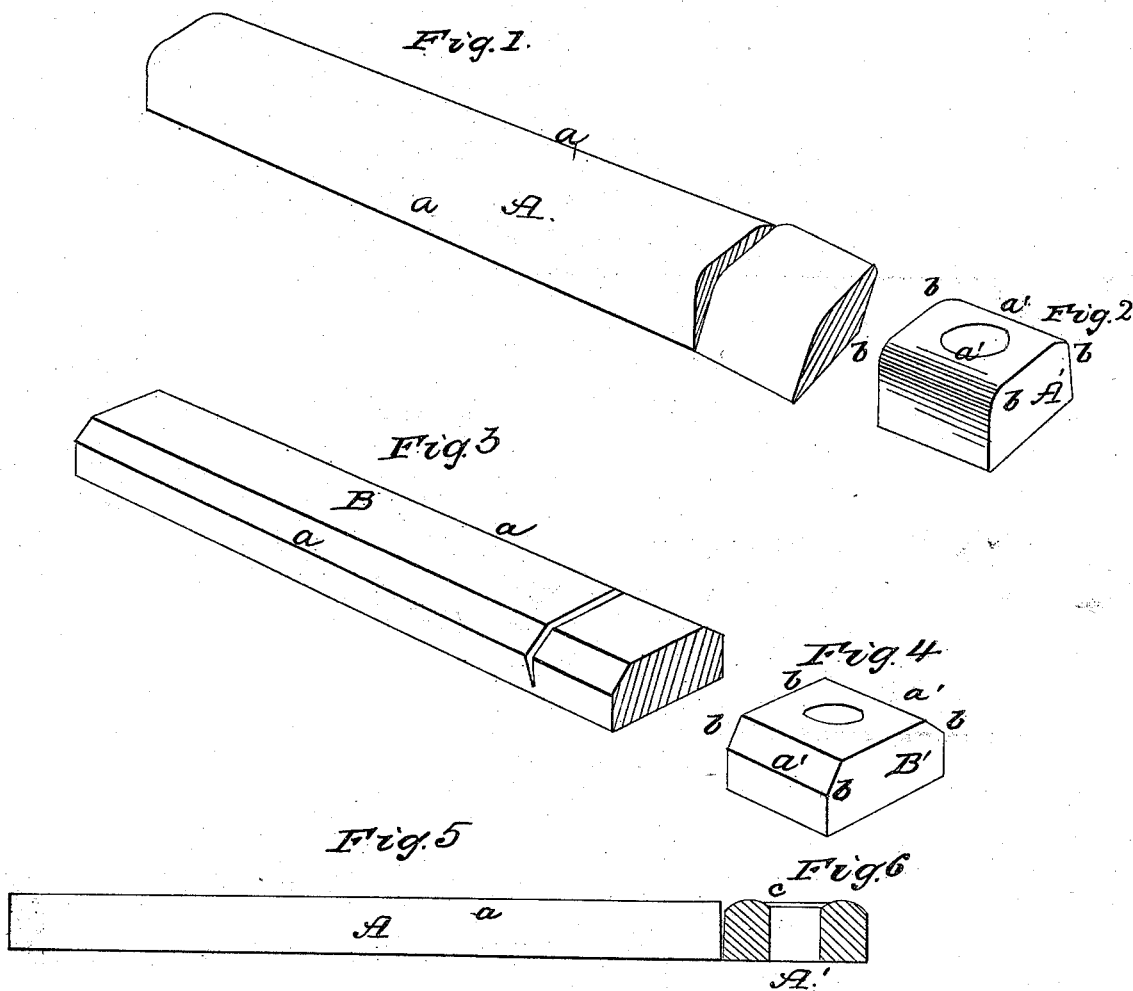

UNITED STATES PATENT OFFICE.

LEOPOLD THOMAS, OF ALLEGHENY CITY, PENNSYLVANIA.

IMPROVEMENT IN MANUFACTURE OF NUTS.

Specification forming part of Letters Patent No. 42,320, dated April 12, 1864.

*To all whom it may concern:*

Be it known that I, LEOPOLD THOMAS, of Allegheny City, county of Allegheny, State of Pennsylvania, have invented a new and useful Improvement in the Manufacture of Nuts; and I do hereby declare that the following is a full, clear, and exact description thereof, reference being had to the accompanying drawings, making a part of this specification, in which—

Figure 1 is a perspective view representing a bar of metal having two of its longitudinal edges rounded and a portion nearly severed from it. Fig. 2 represents a punched nut made from the bar, Fig. 1. Fig. 3 is a perspective view of a bar having two of its longitudinal edges beveled angularly and a portion nearly severed from it. Fig. 4 represents a nut made from the bar of Fig. 3. Fig. 5 is a side view or edge view of the bar of Fig. 1. Fig. 6 is a sectional view of a nut cut from this bar and punched.

Similar letters of reference indicate corresponding parts in the several figures.

The object of my invention is to produce beveled or chamfered edge nuts from bars of metal prepared in such manner as to obviate the necessity of swaging or squeezing the nut blocks or blanks in dies, as will be hereinafter described.

To enable others skilled in the art to understand my invention, I will describe its construction and operation.

The object of chamfering or beveling the edges of nuts is not only to give to them a better finish, but to remove the sharp corners around the face of the nuts, which would be liable to deface and injure anything with which they might come in contact in applying them to bolts. This form of nuts has hitherto been produced by swaging and squeezing the blocks or blanks into shape while they are confined within die-boxes, which operation is attended with risk of injury to the several parts the machine, besides requiring the expenditure of enormous power to reduce the metal into a smaller compass, and this is particularly the case when the nuts are made cold.

My invention consists in preparing the bars of metal from which the nuts are to be cut with two of their longitudinal edges beveled or rounded, as shown at *a a*, Figs. 1 and 3. This may be done by passing bars between rollers of the required form during the operation of rolling and drawing the bars down to the proper width and thickness to form nuts. From such bars I am enabled to produce chamfered or beveled edge nut blocks or blanks by simply severing the blanks from the bars, as represented in Figs. 1 and 3, and whatever form of bevel the bars may have, the blocks which are cut from them will retain, as represented in the two Figs. 2 and 4. The edges *a a* of the bar A are rounded, and hence the rounded edges *a' a'* will be found on the nut-blanks A' cut from this bar. The edges *a a* of the bar B are beveled angularly, the result of which is to furnish the correspondingly-beveled nuts or nut-blanks B', the four corners *b b b b* of both forms of nuts being removed by the beveled edges.

The operation of swaging and compressing the blocks while they are confined within a die-box, as hitherto practiced, is by the use of beveled-edge bars rendered unnecessary, and the only force required is that which will be sufficient to cut the blocks from the bars and punch holes through them, which can be done by the ordinary punches and dies employed for making nuts.

I do not confine my invention to the use of bars having any definite form of bevel or chamfer, for it will be seen that the advantage to be derived is the removal of the sharp corners of the nut, which can be done by chamfering the longitudinal edges of the nut-bars in a variety of forms. Still the beveled and rounded forms represented in Figs. 1 and 3 are preferable, on account of their simplicity and the facility with which they can be made.

I have represented in Fig. 6 a section of a nut produced from a beveled edge of metal. The section is taken across or at right angles to the beveled edges, and intended to show that I am not only enabled to produce nuts with two beveled edges, but in the operation of severing the nuts from the beveled bars I form a rounded finished surface, *c*, and thus make the nuts approach very nearly to the form of those made by swaging and beveling their edges in dies.

I do not confine myself to the use of any particular kind of machinery or form of tools for making nuts from beveled bars, as almost any machine which will cut a nut-blank from a bar of metal and punch it may be used to carry into effect my invention.

Having thus described my invention, what I claim as new, and desire to secure by Letters Patent, is—

Forming nut blanks by the use of beveled-edged bars previously prepared, substantially as described.

LEOPOLD THOMAS.

Witnesses:
D. NEILLIE,
S. WHITESETT.